(12) United States Patent
Altmann (10) Patent No.: US 8,692,937 B2
(45) Date of Patent: Apr. 8, 2014

(54) VIDEO FRAME SYNCHRONIZATION

(75) Inventor: William Conrad Altmann, San Jose, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 208 days.

(21) Appl. No.: 12/712,933

(22) Filed: Feb. 25, 2010

(65) Prior Publication Data

US 2011/0205433 A1     Aug. 25, 2011

(51) Int. Cl.
*H04N 9/475* (2006.01)
*H04N 9/74* (2006.01)
*H03L 7/00* (2006.01)
*G09G 5/00* (2006.01)

(52) U.S. Cl.
USPC ........... 348/513; 348/588; 348/537; 348/584; 345/1.3

(58) Field of Classification Search
USPC ......... 348/500, 512, 513, 516, 537, 705–706, 348/588, 501, 510, 584; 713/503; 714/700; 345/1.3
See application file for complete search history.

(56) References Cited

U.S. PATENT DOCUMENTS

| | | | | |
|---|---|---|---|---|
| 5,914,757 A * | 6/1999 | Dean et al. | | 348/584 |
| 5,995,140 A * | 11/1999 | Cooper et al. | | 348/159 |
| 6,317,166 B1 * | 11/2001 | McCutchen | | 348/722 |
| 6,456,335 B1 * | 9/2002 | Miura et al. | | 348/588 |
| 6,515,707 B1 * | 2/2003 | Lee | | 348/513 |
| 6,909,468 B2 * | 6/2005 | Kawada et al. | | 348/518 |
| 7,321,403 B2 * | 1/2008 | Yanagisawa et al. | | 348/723 |
| 7,418,012 B2 * | 8/2008 | Busch | | 370/508 |
| 7,423,693 B2 * | 9/2008 | Cole | | 348/518 |
| 7,636,126 B2 * | 12/2009 | Mallinson | | 348/515 |
| 7,746,969 B2 * | 6/2010 | Bryan et al. | | 375/349 |
| 7,844,762 B2 * | 11/2010 | Banks et al. | | 710/62 |

(Continued)

FOREIGN PATENT DOCUMENTS

| | | |
|---|---|---|
| GB | 2415852 A | 1/2006 |
| KR | 10-0303970 | 9/2001 |
| WO | WO 03/023587 A2 | 3/2003 |

OTHER PUBLICATIONS

*NVIDIA Accelerated Linux Graphics Driver Readme and Installation Guide*, NVIDIA Corporation, 2006-2009, 12 pages.

(Continued)

*Primary Examiner* — Brian Yenke
(74) *Attorney, Agent, or Firm* — Fenwick & West LLP (57) ABSTRACT

Embodiments of the invention are generally directed to video frame synchronization. An embodiment of a method includes receiving a first video data stream from a first source at a first port of a multi-port device, a first video frame of the first video data stream arriving at the first port at a first arrival time, and receiving a second video data stream from a second source at a second port of the multi-port device, a second video frame of the second video data stream arriving at the second port at a second arrival time. The method further includes determining an offset between the first arrival time and the second arrival time, determining one or more correction factors based at least in part on the offset, the one or more correction factors including a first correction factor for the first source, and sending a first command to the first source to modify a time of transmission by the first source of a third video frame following the first frame using the correction factor.

39 Claims, 9 Drawing Sheets

(56) References Cited

U.S. PATENT DOCUMENTS

| | | | |
|---|---|---|---|
| 7,920,209 B2 * | 4/2011 | Mallinson | 348/515 |
| 7,982,803 B2 * | 7/2011 | Lee | 348/515 |
| 8,111,334 B2 * | 2/2012 | Mizutani et al. | 348/705 |
| 2001/0055470 A1 * | 12/2001 | Yoshimoto et al. | 386/68 |
| 2005/0083437 A1 | 4/2005 | Uchida et al. | |
| 2006/0012540 A1 | 1/2006 | Logie et al. | |
| 2006/0156376 A1 * | 7/2006 | Mukaide et al. | 725/135 |
| 2007/0230913 A1 * | 10/2007 | Ichimura | 386/96 |
| 2008/0007616 A1 * | 1/2008 | Baladhandayuthapani | 348/14.12 |
| 2008/0117984 A1 * | 5/2008 | Hao et al. | 375/240.26 |
| 2008/0151119 A1 * | 6/2008 | Suzuki | 348/569 |
| 2008/0291863 A1 * | 11/2008 | Agren | 370/315 |
| 2009/0027405 A1 * | 1/2009 | Kaga | 345/520 |
| 2009/0073316 A1 * | 3/2009 | Ejima | 348/515 |
| 2009/0178097 A1 | 7/2009 | Kim et al. | |
| 2009/0213267 A1 | 8/2009 | Musunuri et al. | |
| 2010/0067877 A1 * | 3/2010 | Ichimura et al. | 386/96 |
| 2010/0142723 A1 * | 6/2010 | Bucklen | 381/81 |
| 2010/0235483 A1 * | 9/2010 | Kambhatla | 709/222 |
| 2011/0023064 A1 * | 1/2011 | Tsai et al. | 725/48 |
| 2011/0134330 A1 * | 6/2011 | Yu et al. | 348/705 |
| 2011/0148672 A1 * | 6/2011 | Domingo et al. | 341/50 |
| 2011/0150215 A1 * | 6/2011 | Domingo et al. | 380/200 |
| 2011/0150216 A1 * | 6/2011 | Barry et al. | 380/201 |
| 2011/0157473 A1 * | 6/2011 | Choi et al. | 348/566 |
| 2011/0164118 A1 * | 7/2011 | Choi et al. | 348/51 |
| 2012/0027203 A1 * | 2/2012 | Inada | 380/42 |

OTHER PUBLICATIONS

*PC Video Synchronization and Playback*, Microsoft Corporation, Dec. 4, 2001, 4 pages.

*Frame Lock Frame Synchronization*, NVIDIA Corporation, Feb. 25, 2010, 2 pages, www.nvidia.com/object/IO_10794.html.

*Genlock*, Wikipedia Organization, 2 pages, http://en.wikipedia.org/wiki/Genlock.

Kovaks, J., *AN5: An Overview of Genlock*, Microimage Video Systems, Oct. 1, 2001, www.mvis.com/technical/appnotes/an005.html.

*Genlock*, NVIDIA Corporation, Feb. 25, 2010, 1 page, www.nvidia.com/object/IO10793.html.

International Search Report and Written Opinion for PCT Patent Application No. PCT/US2011/025199 Mailed Oct. 28, 2011, 9 Pages.

European Extended Search Report, European Application No. 11747884.2, Jan. 23, 2014, 7 pages.

\* cited by examiner

VIDEO FRAME SYNCHRONIZATION

TECHNICAL FIELD

Embodiments of the invention generally relate to the field of data communications and, more particularly, video frame synchronization.

BACKGROUND

In certain systems, streams of data may be transmitted over data links between data source devices and receiving devices, which may include sink or repeater devices that use or retransmit the stream data. In certain implementations, a sink or repeater device may include multiple ports, and may be receiving data streams at two or more of such ports. For example, a video system may receive multiple data streams at different ports.

However, because of variations in devices, distances, and transmission protocols, the video streams may not be properly aligned, or synchronous, with each other when video frames arrive at the sink or repeater device. The misalignment in timing may cause difficulties or errors in utilizing the video streams, and the misalignment may vary over time. Synchronization of source devices with each other may generally require communication between such source devices, and may require a significant amount of computational overhead for the source devices.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Embodiments of the invention are generally directed to video frame synchronization.

In a first aspect of the invention, an embodiment of a method includes receiving a first data stream from a first source at a first port of a multi-port device, a first frame of the first data stream arriving at the first port at a first arrival time, and receiving a second data stream from a second source at a second port of the multi-port device, a second frame of the second data stream arriving at the second port at a second arrival time. The method further includes determining an offset between the first arrival time and the second arrival time, determining one or more correction factors based at least in part on the offset, the one or more correction factors including a first correction factor for the first source, and sending a first command to the first source to modify a time of transmission by the first source of a third frame following the first frame using the correction factor.

In a second aspect of the invention, an embodiment of method includes generating a data stream of video frames for transmission to a port of a multi-port device, and transmitting the video frames to the multi-port device, including timing transmission of the video frames with an output timing generator. The method further includes receiving one or more alignment commands from the multi-port device, each alignment command containing a correction factor for the transmission of a next following video frame to adjust alignment with video frames arriving at one or more other ports of the multi-port device, and adjusting a transmission time for the next following video frame based on the correction factor contained in each command.

DETAILED DESCRIPTION

Embodiments of the invention are generally directed to video frame synchronization.

In some embodiments, a method, apparatus, or system provides for video frame synchronization, allowing for adjustment of data alignment across multiple ports. In some embodiments, a method, apparatus, or system may utilize closed-loop digital timing commands to provide for synchronization of video frames across multiple ports of an apparatus or system. As used herein, synchronization means the adjustment of timing with regard to data arrival, and may include adjustments to align video frame arrival to a common time or to provide desired offsets in arrival of video frames.

A method, apparatus, or system to provide closed-loop control of frame timings among multiple ports may allow for a device, such as a DTV (digital television), to improve port-switching time, and improve other features, such as picture-in-picture display. In some embodiments, method, apparatus, or system provides for synchronization of video streams for digital connections under the control of the receiving device, such the synchronization of A/V (audio/visual) data streams under control of a DTV having the multiple ports. In some embodiments, a receiving device may be a device utilizing received data, referred to herein as a "sink", or may be an intermediary device or switch, referred to herein as a "repeater".

Video data in the form of streams of video frames may be received by a device. Video data streams may be generated by, for example, decoding compressed video, with compressed data including standards such as MPEG-2 (Moving Pictures Expert Group), MPEG-4, or H.264 of the Visual Coding Experts Group (VCEG). In an implementation, a decoder in the source system reads successive blocks of compressed video information, and generates the actual frames of pixel information and the HSYNC (horizontal synchronization) and VSYNC (vertical synchronization) timings in order to output uncompressed video to the next repeater or sink device.

However, in a decoder, decoding logic may run on one set of clocks, while a frame output element (a frame output state machine) may run on a different set of clocks. In such a decoder, the frame output state machine may read the video frame data to be transmitted (referred to herein as pixel data), frame by frame, from a last frame buffer, which may be a part of the decoder's memory architecture. In some embodiments, because a frame output state machine is not locked to the decoder state machines' timings, it is possible to adjust the start time of a frame as it is read from the last frame buffer. In some embodiments, with this flexibility, a frame output state machine may generate an uncompressed video stream that has its VSYNC edges at arbitrarily early or late moments in time, relative to any absolute time.

As used herein, a Source is a device providing a video data stream, with a Sink device being a device utilizing a video data stream and a Repeater device being a device that forwards (or repeats) a video data stream to another device. In an example, if an absolute time (referred to here as $T_{ZERO}$) is the latest arrival time of a video frame at one of the multiple input ports on a Sink or Repeater device, such as a DTV (digital television) or other similar element for video data, then the arrival times of the video frames at all the other input ports will be earlier than $T_{ZERO}$. By delaying each port's arrival time a specific amount, it is possible that the arrival times of the ports' video streams be synchronized with each other, so that all streams arrive near $T_{ZERO}$ or that all streams arrive with certain offsets to each other.

However, the frame timings, based on the leading edge of VSYNC, for example, are not constant, even for a continuous stream of video at one video resolution. If, for example, a total frame time is one sixtieth of a second (1/60), corresponding to a vertical refresh rate of 60 Hertz, then under ideal conditions the Nth frame would arrive at exactly N/60 seconds relative to the arrival time of the first frame. However, variation in the video pipeline causes variation in this timing, and thus variation in arrival times of video frames.

In some embodiments, adjustment of port frame timings is provided continuously, rather than a one-time correction. In some embodiments, in order to perform a continuous correction, an interface from video sources to input ports on a sink (or repeater) provides for closed-loop command communication of timing correction. In operation, video frames from each Source device arrive at one of multiple input ports of a Sink or Repeater. In some embodiments, a logic of the Sink or Repeater measures each frame's arrival time relative to a constant clock signal. In some embodiments, the Sink or Repeater determines correction factors and sends a command or other similar data back to each Source to inform the Source how much its transmission time for video frames should be adjusted in order to provide a desired alignment of arrival times for video frames at each of the multiple ports. Thus, an embodiment of a method, apparatus, or system provides closed-loop timing correction of multiple video data streams, such as multiple concurrent uncompressed video streams.

A link clock (also referred to as a pixel clock for video stream data) associated with a port receiving a video data stream may be asynchronous with respect to the link clocks of the other port's video streams. In some embodiments, the arrival times of video frames at a Sink or Repeater may be measured using one of the incoming pixel clocks, or using a clock generated in the Sink or Repeater of the same frequency as one of the incoming pixel clocks. Using the pixel clock frequency allows the Source device to advance or delay its output video frame by integer numbers of pixel clock periods, which may be utilized to provide for adequate adjustment sensitivity. In some embodiments, any remaining mismatch among the asynchronous ports' timings may be corrected using a multi-port memory, FIFO (First In First Out) buffer, or other memory element of the Sink or Repeater.

In some embodiments, the correction of the arrival times of multiple ports' video streams such that all video streams arrive with nearly coincident VSYNC leading edges allows the Sink or Repeater to sample any one of the ports' video content, and switch from one to another, without having to consider the relative frame timing. Thus, all ports' video frames are loosely locked together.

In some embodiments, additional timing adjustment may be used to intentionally offset one port's frame timing from another port's frame timing. In an example, a repeater may include four input ports (Ports #1-4), and the video from Port #1 is to be output in the upper-right one-fourth of the output frame; the video from Port #2 in the upper-left; the video from Port #3 in the lower-left; and the video from Port #4 in the lower-right. In some embodiments, the offsetting of Port #2, #3 and #4 from Port #1 (which, in this example, may be the earliest stream) provides that a switch may sample each port's video on-the-fly and construct a single output frame that consists of the upper-left one-fourth of each input frame's content. However, embodiments are not limited to methods, apparatuses, or systems in which an output includes these multiple output elements. Other embodiments may include additional schemes with flexible input timing adjustments. In some embodiments, a closed-loop mechanism for sending timing correction information back to each Source may differ from one digital interconnect standard to another. In an example, for the transmission of HDMI™ (High-Definition Multimedia Interface) data, a CEC (Consumer Electronics Control) bus command may be used to transmit the delay adjustment value from the Repeater or Sink to Source. In a second example, for MHL™ (Mobile High-Definition Link) data, a CBUS command may be used to transmit the delay adjustment value from the Repeater or Sink to Source. The use of varying interconnect standards may require differing timing for each data stream.

In some embodiments, each communication channel utilized has a low latency (such as much less than a frame time) and sufficient bandwidth to allow for transmitting a command at least once per frame for interfaces running at speeds such as 60 Hertz. However, embodiments are not limited to such communication channels. In some embodiments, it may be assumed that faster frame rates do not vary significantly from frame to frame, and may carry a command once every N frames, with the commands being sent frequently enough to maintain control over drift of frames' leading edge VSYNC. In some embodiments, the frequency of commands may be affected by memory structure of the Sink or Repeater. The depth of a memory element, such as a multi-port memory or FIFO buffer, in a Sink or Repeater affects the degree of control the system is required to have over drift in frame-to-frame timings, where deeper memories may allow frames to drift apart more than shallower memories.

In some embodiments, a memory controller on the Source side is enabled to quickly react to a command sent to it in order to minimize latency in correcting output frame timings. In some embodiments, the memory controller is programmable to move the "frame start" timing (to the frame buffer) in small increments, such as individual pixel clock counts.

In some embodiments, a method, apparatus or system is applied to multiple ports on a Sink or Repeater when the incoming video streams are all in the same video mode, such as 720p/60 (HDTV (High Definition Television) mode with 720 horizontal progressive (non-interlaced) scan lines at 60 Hertz refresh rate) or 1080p/60 modes. In some embodiments, each port for receiving video streams may have a common frequency pixel (or link) clock, even though phase, drift, and jitter may differ from port to port. A memory element, such as a multi-port memory or FIFO buffer, with an independent Sink-side clock of the same frequency, may be used to further re-synchronize the pixel streams.

In some embodiments, a method, apparatus or system is applied to multiple ports on a Sink or Repeater when the incoming streams are in different video modes, with different pixel clock frequencies, wherein further re-synchronization may be implemented with pixel repetition (reading the same pixel more than one time from FIFO buffers that were written for lower resolution video modes), or with scaling of data.

In some embodiments, a feedback command to carry a timing correction factor may contain a stream name to identify the data stream, a port index (from the Sink or Repeater point of view), the absolute time to be adjusted (in, for example, units of pixel clock cycles), and possibly other fields related to maintaining the adjustment (such as an adjustment period). In some embodiments, each of these parameters may be determined by the Sink side logic, thus placing little burden on the Source systems. In some embodiments, each Source system reads the incoming feedback commands, and adjusts the output timing generator to create new frame timings.

When a Source system changes its video stream, such as by changing channel or changing video mode on user request, the output video stream generally will have a new frame timing and possibly a new pixel frequency. In some embodiments, a Sink or Repeater device recognizes and reacts to this change, and transmits a feedback command to the respective Source to re-adjust frame synchronization. For certain digital interfaces, a notification of a new video mode or a change to a new channel may be communicated proactively, allowing the Sink or Repeater to ready itself for the necessary measurements and correction determinations. In some embodiments, because a Sink or Repeater is responsible for monitoring the frame timings from port to port to assess drift, the Sink may use the same mechanism to react to channel changes or video mode changes as well.

Streams of video data, such as streams of HDMI, DVI (Digital Visual Interface), and MHL data, may be encrypted. In some embodiments, the video frames contained within data streams may be measured and synchronized in encrypted form without access to the video content of any stream. In some embodiments, the encryption of the video frames does not affect the measurement of arrival times and the correction of the offset between frames arriving at different ports of a multi-port apparatus or system.

In some embodiments, any of the Sink's input ports may be selected as a "master" port, the master port being the port to which all other ports of the Sink synchronize their frame timing. In some embodiments, because frame timing repeats at the "vertical refresh rate", a port that may appear to be the latest to arrive relative to the other ports may instead be considered to be the earliest arrival when compared with the next frame. In this way, each port's timing may be measured and adjusted with respect to the master port's timing.

An embodiment of a method, apparatus, or system provides digital corrections, and differs from conventional analog systems, such as Frame Lock and Genlock (Generator Lock), in that an embodiment may include:

(a) Clocked digital measurement of the frame timing offsets using a Source device's link clocks;

(b) Utilization of a command bus to communicate the correction factors back to each Source;

(c) An ability to intentionally offset the timing so that differing parts of the frames overlap at the Sink or Repeater; and (d) Accommodation for inputs with varying signal aspects (video resolutions or frame rates) using a single, digital measurement and communication feedback loop.

Figure 1:
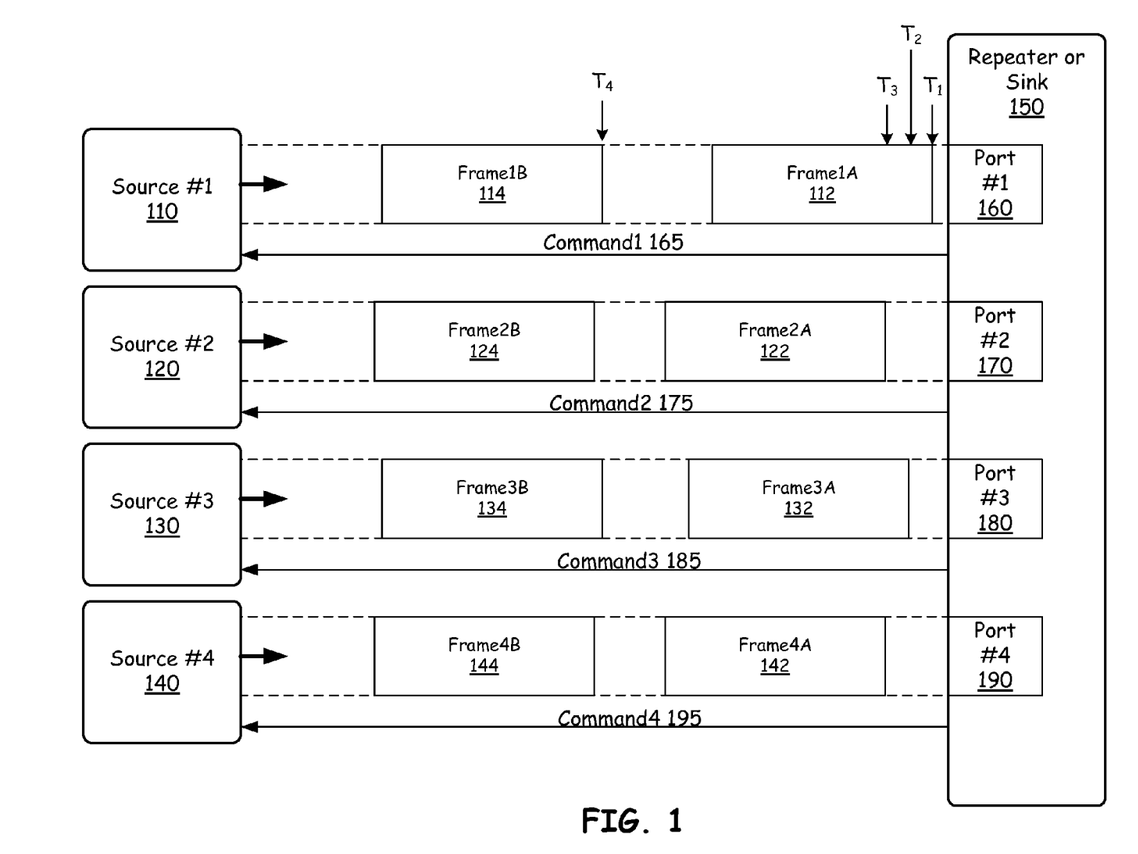
FIG. 1 is an illustration of an embodiment of video frame synchronization for multiple ports using closed loop commands.

FIG. 1 is an illustration of an embodiment of video frame synchronization for multiple ports using closed loop commands. In this illustration, various sources, illustrated here as Source #1 110, Source #2 120, Source #3 130, and Source #4 140. While FIG. 1 illustrates a separate source for each video data stream, in some implementations one source might provide multiple video data streams to multiple ports. As shown in FIG. 1, a Repeater or Sink device 150 includes four ports, although a source or repeater may include a plurality of ports of any number. FIG. 1 illustrates Source #1 110 providing a stream of video frames to Port #1 160, source #2 120 providing a stream of video frames to Port #2 170, source #3 130 providing a stream of video frames to Port #3 180, and source #4 140 providing a stream of video frames to Port #4 190.

In the example provided in FIG. 1, a first video frame sent by each of the sources arrives at differing times, with Frame1A 112 from Source #1 110 arriving at $T_1$, Frame3A 132 from Source #3 130 arriving at $T_2$, and Frame2A 122 from Source #2 120 and Frame4A 142 from Source #4 140 arriving at $T_3$. The video frames may be in encrypted or non-encrypted form. In some embodiments, the Repeater or Sink 150 and the sources utilize closed loop commands to synchronize the arrival of video frames to provide for a desired alignment of the frames. In some embodiments, the Repeater or Sink 150 sends a feedback alignment command to one or more of the sources to modify the transmission time of video frames from such sources in order to change the alignment. In this illustration, Command1 165 is transmitted to Source #1 110, Command2 175 is transmitted to Source #2 120, Command3 185 is transmitted to Source #4 130, and Command4 175 is transmitted to Source #4 140. In some embodiments, the sources modify the transmission of the following (second) video frames according to the received commands. In some embodiments, the Repeater or Sink then measures the arrival times for the second video frames and transmits one or more new alignment commands to the sources, continuing the closed feedback loop. The result of the alignment commands may be a correction in synchronization resulting in closer alignment of the next set of frames, illustrated as Frame1B 114, Frame2B 124, Frame3B 134, Frame4B 144 arriving more closely to a uniform time, shown here as time $T_4$. While synchronization and alignment for video frames provides for frames arriving at or near the same time in the example shown in FIG. 1, embodiments of the invention are not limited to this alignment. Differing alignments may be desired for different implementations, including, for example, the alignment described for FIG. 4. While FIG. 1 illustrates the Repeater or Sink 150 sending an alignment to every source, in some embodiments the alignment commands may only be sent to the sources that require synchronization changes.

Figure 2:
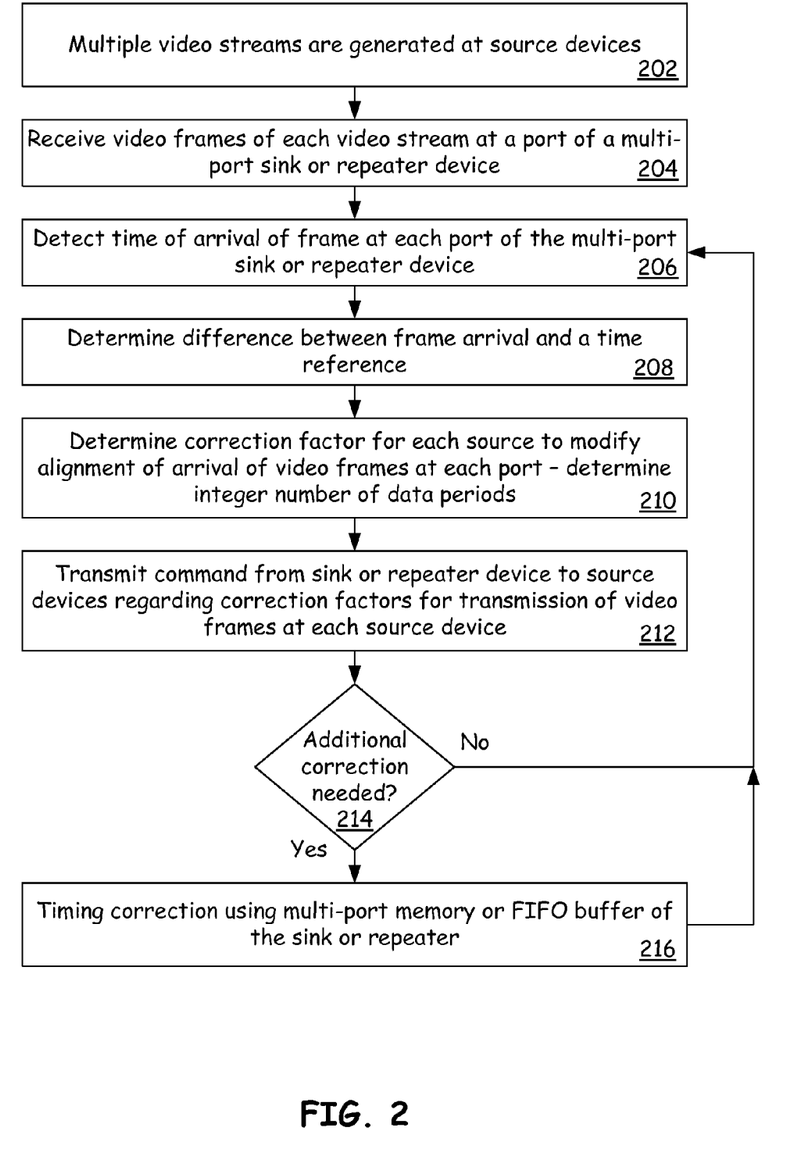
FIG. 2 is a flow chart to illustrate an embodiment of a process for video frame synchronization.

FIG. 2 is a flow chart to illustration an embodiment of a process for video frame synchronization. In some embodiments, multiple video data streams are generated at one or more sources 202, with the video frames of each data stream being received at a port of a multi-port sink or repeater device 204. The time of arrival of each frame at each port is detected by the multi-port sink or repeater device 206. The sink or repeater device determines differences between the frame arrival times and a time reference, such as an absolute time value 208. The sink or repeater device determines a correction factor for each source to modify the alignment of video frames at each port. In some embodiments, the correction factor may be an integer number of data periods to simplify the adjustment of transmission points by the sources 210.

In some embodiments, the sink or repeater device transmits commands to one or more of the source devices regarding the correction factors for transmission of video frames at each source device 212. If additional correction is needed for the alignment of the data 214, timing correction may be provided using a multi-port storage element of the sink or repeater device 216. The closed feedback loop then returns to detection of time of arrival of video frames at each port of the multi-port sink or repeater device 206.

Figure 3:
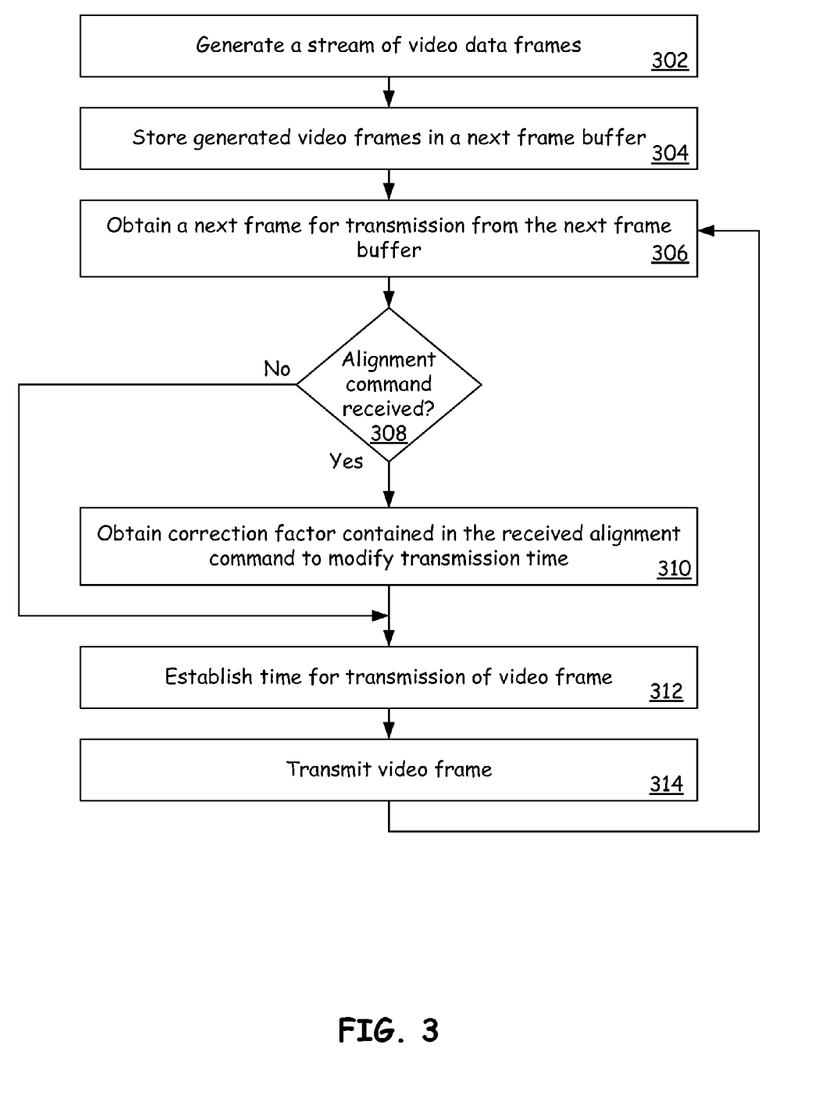
FIG. 3 is a flow chart to illustrate an embodiment of a process for modifying time of transmission of video frames to synchronize arrival of such frames.

FIG. 3 is a flow chart to illustrate an embodiment of a process for modifying time of transmission of video frames to synchronize arrival of such frames. In some embodiments, a stream of video data frames is generated at a source device 302. In some embodiments, the generation of data frames may include use of a decoder to decode encoded data, such as a device decoding compressed video data. In other embodiments, a source may generate video frames without decoding, such as, for example the generation of video frames by a game console or similar device or system. The generated video frames may be stored in memory for transmission, such as storing the video frames in a next frame buffer 304. In some embodiments, a next frame for transmission is obtained from the next frame buffer 306, with the video frames being intended for transmission to a port of a multi-port apparatus or system, the apparatus or system being a sink or repeater element. If an alignment command is not received 308, then the process continues with establishment of a time for transmission of the next video frame 312 and the transmission of such frame at the determined transmission time 314. The process may then continue with a next video frame 306. However, if an alignment command is received 308, a correction factor is obtained from the alignment command 310, which is utilized in the establishment of the time for transmission of the video frame 312, thereby allowing for the synchronization of arrival of data frames at the multi-port apparatus without requiring the source device to coordinate data transmissions with other source devices.

Figure 4:
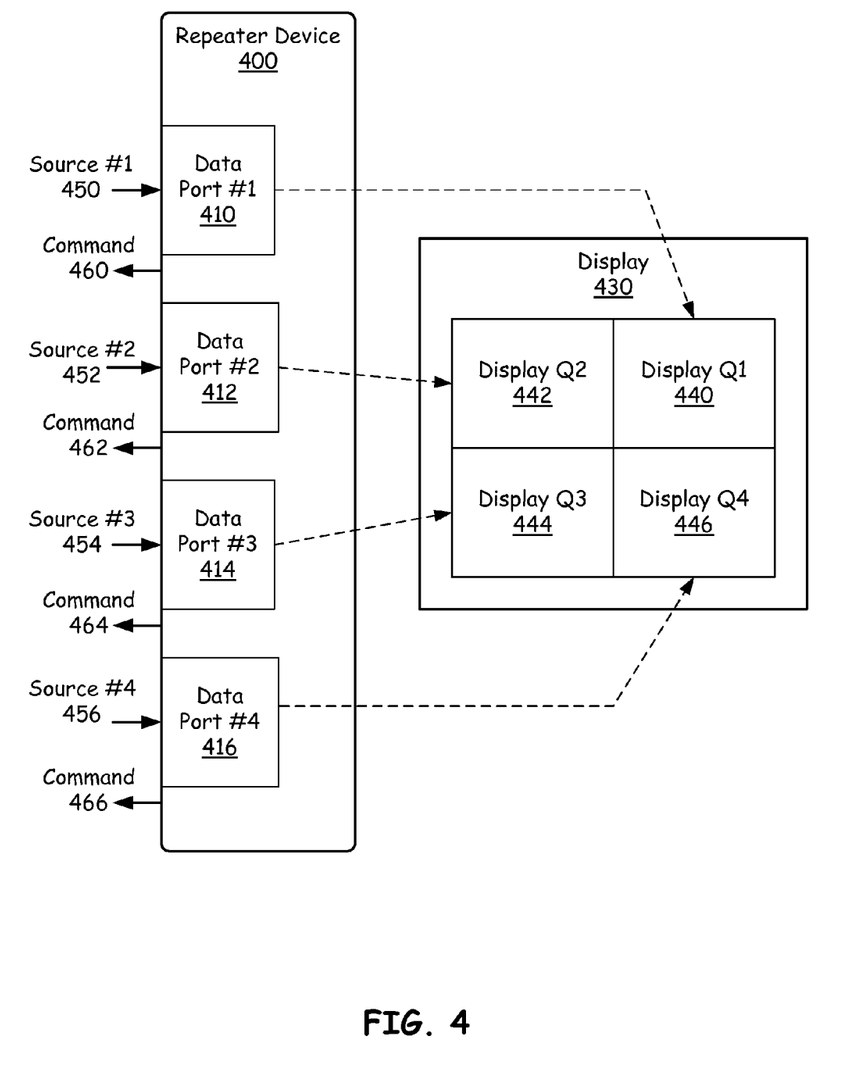
FIG. 4 is an illustration of an embodiment of synchronization for generation of a display image generated from multiple ports.

FIG. 4 is an illustration of an embodiment of synchronization for generation of a display image generated from multiple ports. In this illustration, a repeater device 400 may receive streams of video frames at multiple ports, such as video frames from Source #1 450 arriving at Data Port #1 410, video frames from Source #2 452 arriving at Data Port #2 412, video frames from Source #3 454 arriving at Data Port #3 414, and video frames from Source #4 456 arriving at Data Port #4 416. In this illustration, the video frames are provided to a display 430, with the data streams from each port being utilized to generate a portion of the display 430. In this illustration, Data Port #1 410 provides video data for upper-right portion Q1 440, Data Port #2 412 provides video data for upper-left portion Q2 442, Data Port #3 414 provides video data for lower-left portion Q3 444, and Data Port #4 416 provides video data for lower-right portion Q4 446. In some embodiments, the repeater device 400 provides closed loop alignment commands 460-466 to one or more of the sources. In some embodiments, the alignment commands may be utilized to intentionally offset the frame timing of each port to allow for sampling from each of the frames in a sequence to produce the output.

Figure 5:
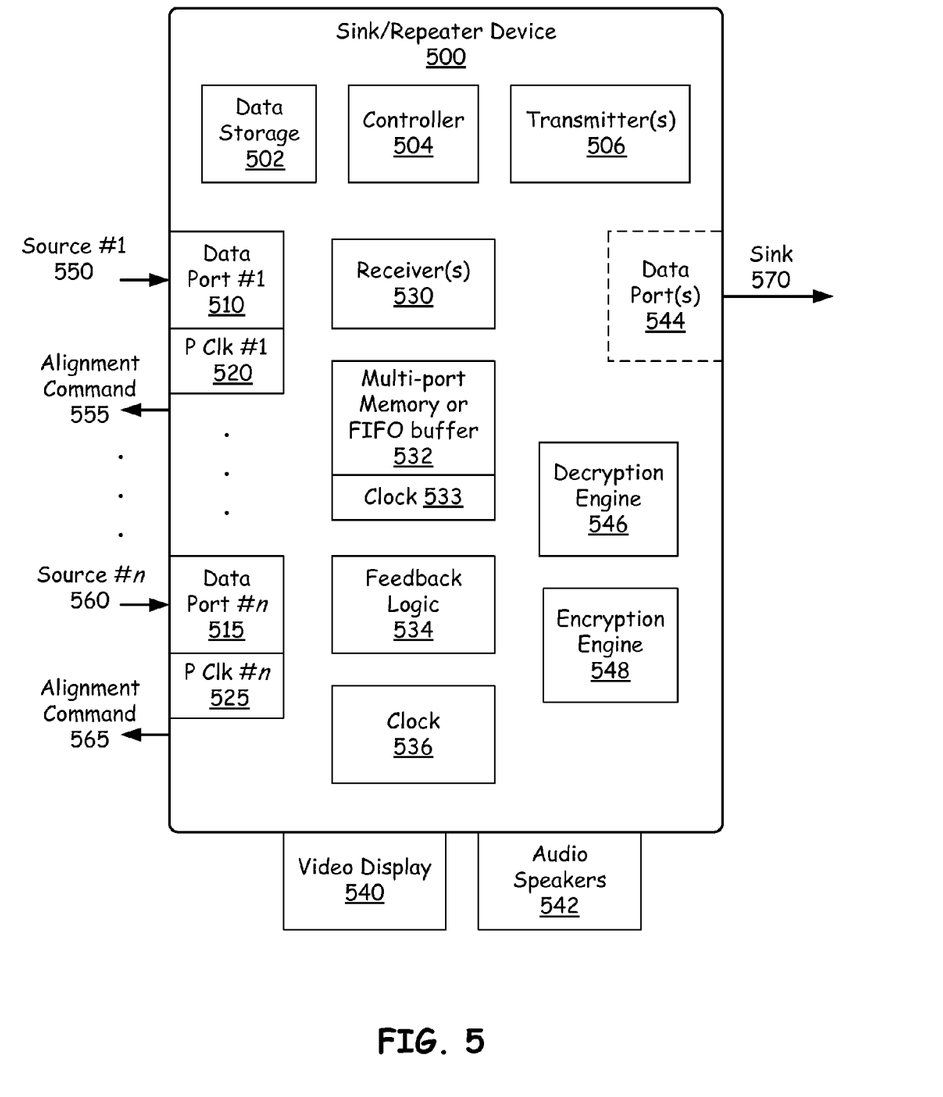
FIG. 5 is an illustration of an embodiment of a sink or repeater device.

FIG. 5 is an illustration of an embodiment of a sink or repeater device. In this illustration, a Sink or Repeater device 500 includes a plurality of data ports, illustrated here as Data Port #1 510 through Data Port #n 515, where n is any integer of 2 or more. Each Data Port may include a clock, which may be referred to as a Pixel Clock for video data, such as Pixel Clock #1 520 for Data Port #1 510 and Pixel Clock #n 525 for Data Port #n 515. In some embodiments, each port is to receive a data stream from a source, with the Device 500 determines differences between arrival times of video frames and transmitting closed loop commands to adjust and maintain alignment between incoming video frames. This is illustrated in FIG. 5 as Source #1 550 providing a data stream to Data Port #1 510 and receiving an alignment command 555, through Source #n 560 providing a data stream to Data Port #n 515 and receiving an alignment command 565.

In some embodiments, the Device 500 may further include one or more receivers 530 for the reception of data, feedback logic 534 to determine the timing difference between arriving video frames and to determine necessary correction for one or more sources, a clock 536 that may be used to determine differences between the arrival times of video frames, and a memory element such as multi-port memory or FIFO buffer 532 that may be used to provide further modification in alignment of data (which may receive a clock signal from an independent clock 533 of the same frequency as the clock 536). The memory element 532 may include, but is not limited to, a buffer to store all or a portion of a video frame, such as a line buffer to store a line of video data. In an example, a line buffer may be implemented to allow for synchronization timing based on the time for transmission of a line of video data (such as +/− one-half of a line time). The Device may include other elements, including data storage 502 to store certain data as needed, a controller or processor 504 to control operations of the Device 500, and one or more transmitters 506 to transmit data to other elements (such as transmission from one or more ports 544 to a Sink device 570). For addressing encrypted data, the Device 500 may include a decryption engine 546 to decrypt received data and an encryption engine 548 to encrypt data prior to transmission. If the Device 500 is a Sink Device, the Device 500 may include one or more presentation devices, including, for example, a video display 540 and audio speakers 542 for presentation of multimedia data.

Figure 6:
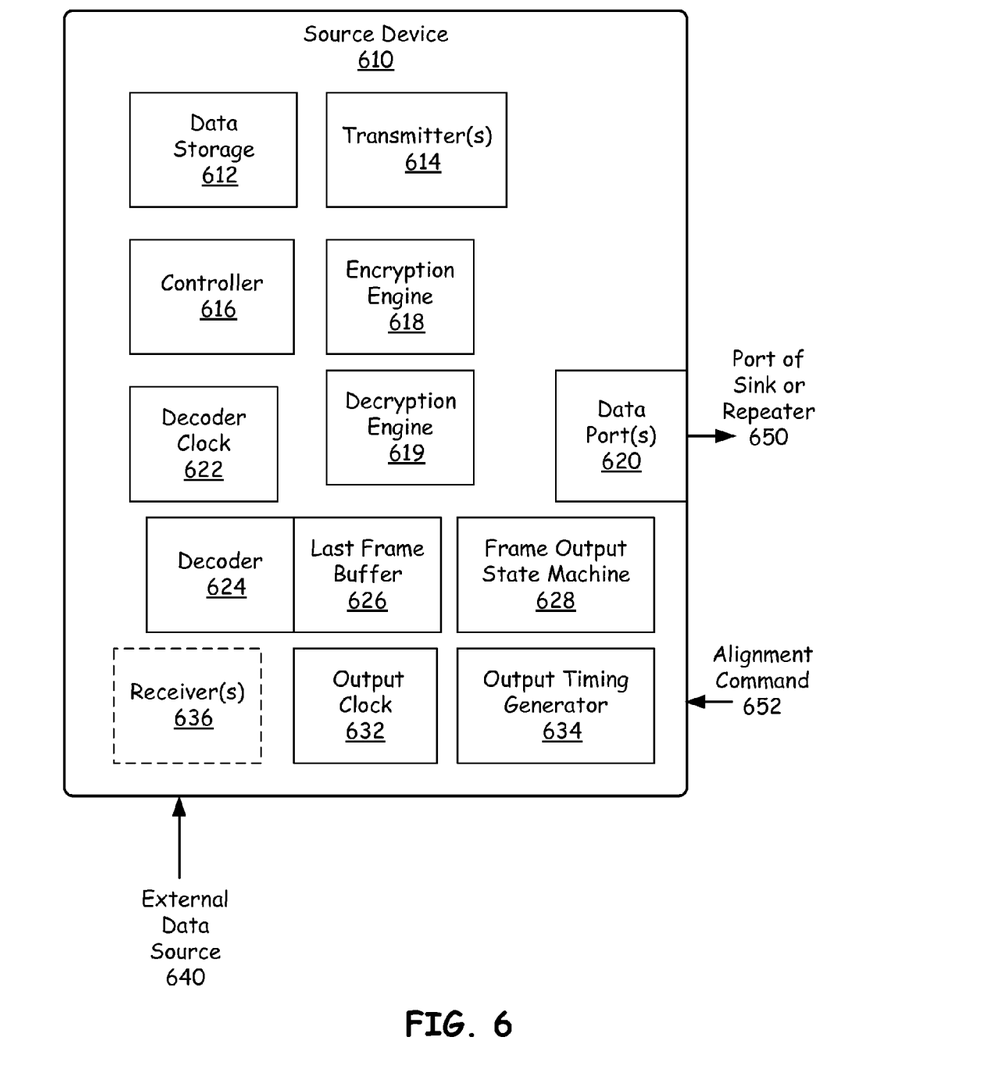
FIG. 6 is an illustration of an embodiment of a source device.

FIG. 6 is an illustration of an embodiment of a source device. In this illustration, a Source Device 610 may provide a video data stream of video frames from one or more Data Ports 620 to a port of a Sink or Repeater Device 650, such as Sink or Repeater Device 500 illustrated in FIG. 5. The Source Device 610 may include a decoder 624 clocked by a decoder clock to generate the video frames, which may be buffered in a last frame buffer 626. In other embodiments, a Source Device 610 may generate video frames without a decoder. In some embodiments, the Source Device 610 may include a frame output state machine 628 to prepare frames from transmission, together with an output timing generator 634 utilizing a clock signal from an output clock 632 to time the transmission of the video frames. In some embodiments, the output timing generator 634 may modify the timing of for the transmission of the video frames based up closed loop alignment commands 652 received from the Sink or Repeater 650. In some embodiments, the output timing generator will constantly adjust timing utilizing the alignment commands 652 to adjust and maintain the alignment of the video frames with video frames of other data streams. The Source Device 610 may include other elements including data storage 612 to store certain data as needed, a controller or processor 614 to control operations of the Device 610, and one or more transmitters 614 to transmit data to other elements. For addressing encrypted data, the Device 610 may include a decryption engine 619 to decrypt received data and an encryption engine 618 to encrypt data prior to transmission. The Device 610 may further include one or more receivers 630 for the receipt of data from an external data source 640.

Figure 7:
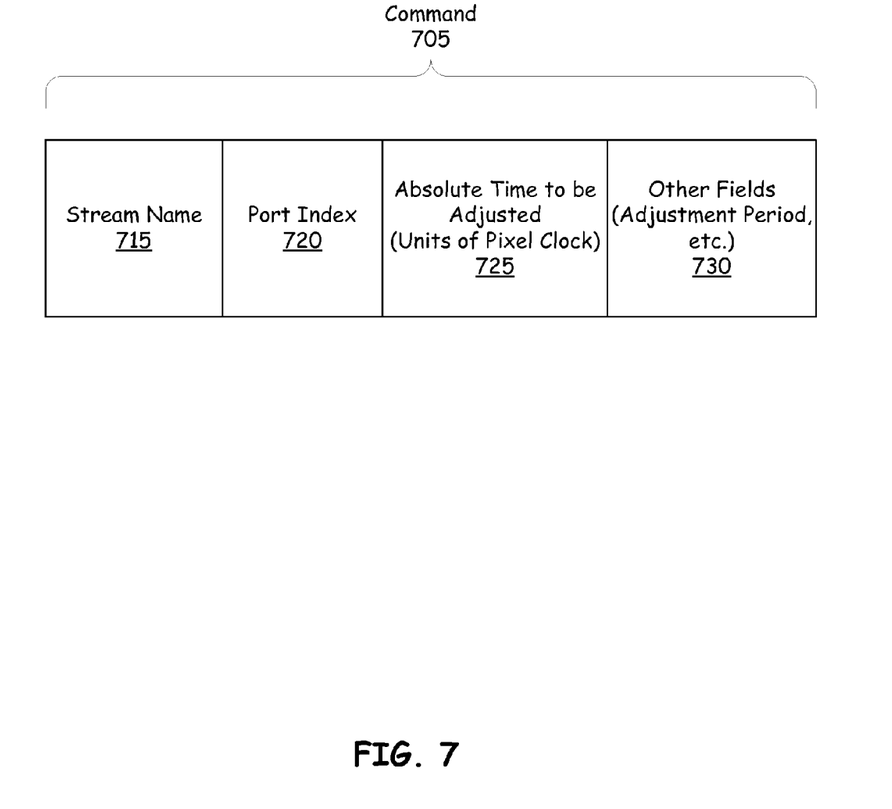
FIG. 7 is an illustration of an alignment command for an embodiment of video frame synchronization.

FIG. 7 is an illustration of an alignment command for an embodiment of video frame synchronization. In some embodiments, a source device may transmit a series of alignment commands in closed loop feedback to adjust maintain alignment of video frames arriving at multiple ports of a sink or repeater device. In some embodiments, a command 705 may include a stream name 715 to identify the data stream, a port index 720 to identify the port of the sink or repeater device at which the data stream is received, an absolute time value for the transmission of video frames to be adjusted (such as, for example, an adjustment in terms of units of a pixel clock), and other fields 730 related to maintaining the adjustment of video frame transmission, such as an adjustment period.

Figure 8:
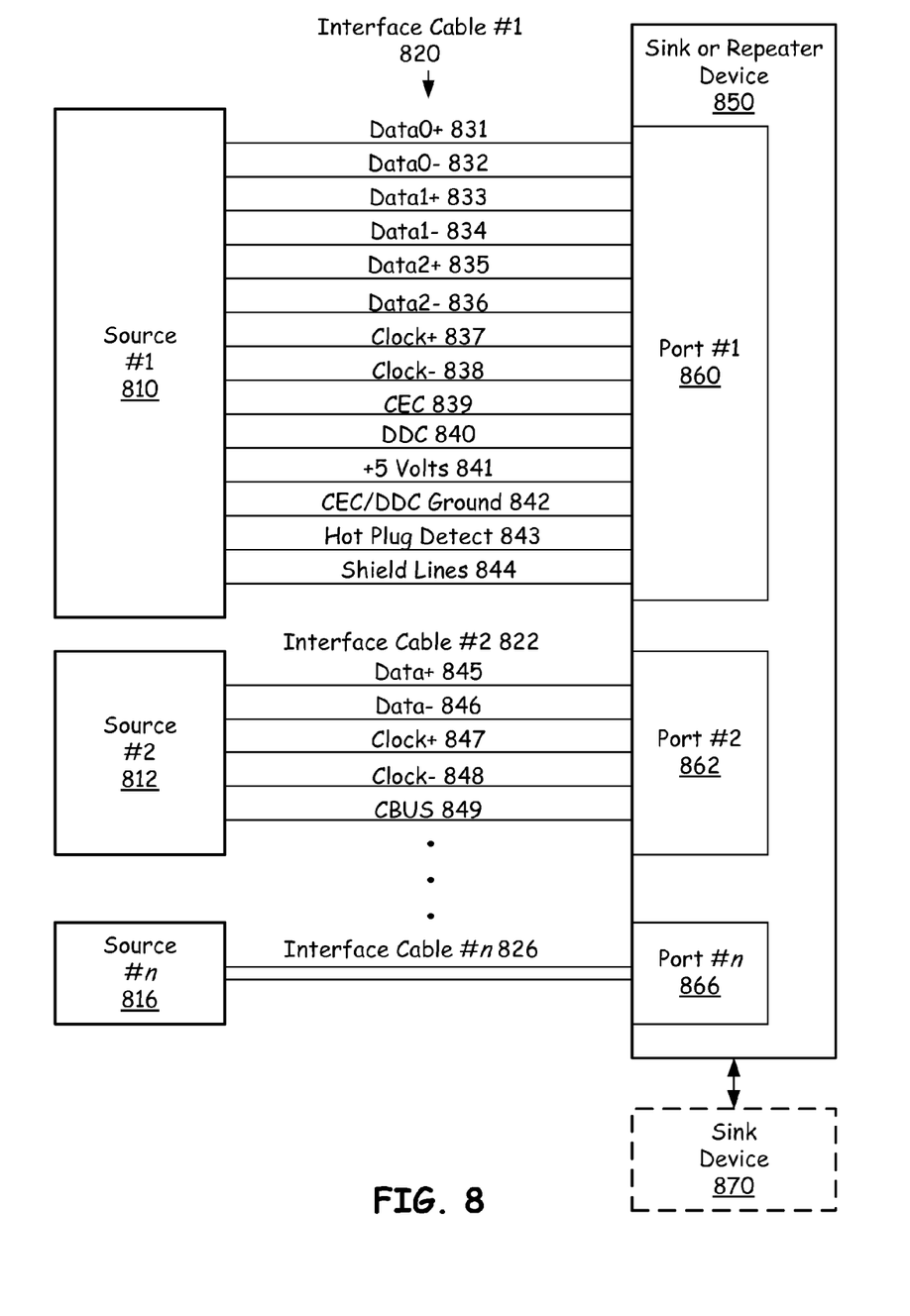
FIG. 8 is an illustration of an interface for an embodiment of video frame synchronization.

FIG. 8 is an illustration of an interface for an embodiment of video frame synchronization. In this illustration, one or more sources are linked to one or more ports of multi-port Sink or Repeater Device 850 via interfaces, such as Source #1 810 coupled with Port #1 860 via Interface Cable #1 820, Source #2 812 coupled with Port #2 862 via Interface Cable #2 822, and Source #n 816 coupled with Port #n 866 via Interface Cable #n 826. A Repeater Device 850 may further be coupled with a Sink Device 870 via one or more ports.

In this illustration, the sources 810-816 may exchange data and commands with the ports 860-866 using various protocols. In this example, Source #1 810 is connected with Port #1 860 with an HDMI interface 820. In this illustration, the interface 820 may include HDMI differential signals transmitted via data0+ line 831, data0− line 832, data1+ line 833, data1− line 834, data2+line 835, and data2− line 836. The interface may further include differential clock lines clock+ 837 and clock− 838; Consumer Electronics Control (CEC) control bus 839; Display Data Channel (DDC) bus 840; +5 volts power 841, CEC/DDC ground 842; hot plug detect 843; and four shield lines 844 for the differential signals. In some embodiments, the Sink or Repeater Device 850 may utilize the CEC control bus 839 for the transmission of closed loop feedback commands to Source #1 810.

In another example, Source #2 812 is connected with Port #2 862 with an MHL interface 822. In this illustration, the interface 822 may include MHL differential signals transmitted via data+ line 845 and data− line 846, differential clock lines clock+ 847 and clock− 848; and control bus CBUS 849.

Figure 9:
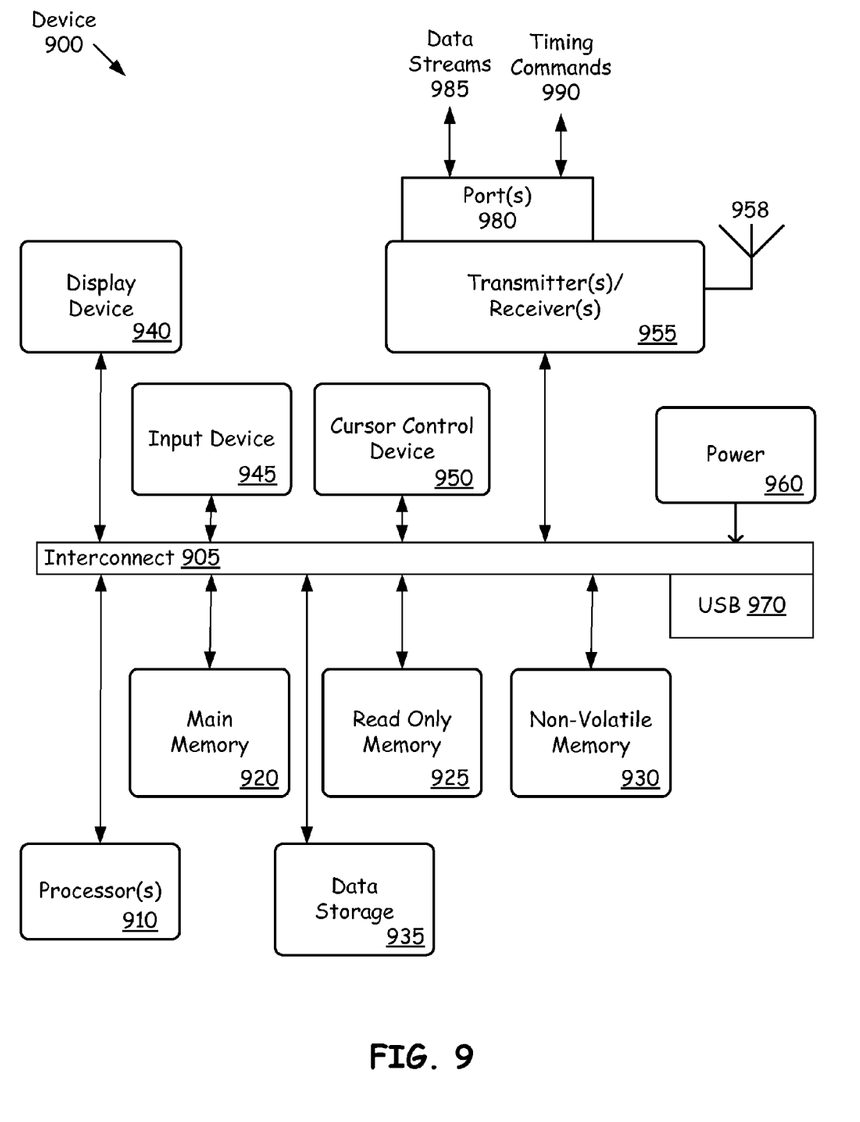
FIG. 9 is an illustration of elements of an embodiment of an apparatus providing for video frame synchronization.

FIG. 9 is an illustration of elements of an embodiment of an apparatus providing for video frame synchronization. In this illustration, certain standard and well known components that are not germane to the present description are not shown. Under some embodiments, a device 900 may be a source device, a repeater device, or a sink device.

Under some embodiments, the device 900 comprises an interconnect or crossbar 905 or other communication means for transmission of data. The data may include audio-visual data and related control data. The device 900 may include a processing means such as one or more processors 910 coupled with the interconnect 905 for processing information. The processors 910 may comprise one or more physical processors and one or more logical processors. Further, each of the processors 910 may include multiple processor cores. The interconnect 905 is illustrated as a single interconnect for simplicity, but may represent multiple different interconnects or buses and the component connections to such interconnects may vary. The interconnect 905 shown in FIG. 9 is an abstraction that represents any one or more separate physical buses, point-to-point connections, or both connected by appropriate bridges, adapters, or controllers. The interconnect 905 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) The device 900 further may include a serial bus, such as USB bus 970, to which may be attached one or more USB compatible connections.

In some embodiments, the device 900 further comprises a random access memory (RAM) or other dynamic storage device as a main memory 920 for storing information and instructions to be executed by the processors 910. Main memory 920 also may be used for storing data for data streams. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may certain registers or other special purpose memory. The device 900 also may comprise a read only memory (ROM) 925 or other static storage device for storing static information and instructions for the processors 910. The device 900 may include one or more non-volatile memory elements 930 for the storage of certain elements.

Data storage 935 may also be coupled to the interconnect 905 of the device 900 for storing information and instructions. The data storage 935 may include a magnetic disk, an optical disc and its corresponding drive, or other memory device. Such elements may be combined together or may be separate components, and utilize parts of other elements of the device 900.

The device 900 may also be coupled via the interconnect 905 to a display or presentation device 940. In some embodiments, the display may include a liquid crystal display (LCD), a plasma display, a cathode ray tube (CRT) display, or any other display technology, for displaying information or content to an end user. In some embodiments, the display 940 may be utilized to display television programming. In some environments, the display 940 may include a touch-screen that is also utilized as at least a part of an input device. In some environments, the display 940 may be or may include an audio device, such as a speaker for providing audio information, including the audio portion of a television program. An input device 945 may be coupled to the interconnect 905 for communicating information and/or command selections to the processors 910. In various implementations, the input device 945 may be a keyboard, a keypad, a touch screen and stylus, a voice activated system, or other input device, or combinations of such devices. Another type of user input device that may be included is a cursor control device 950, such as a mouse, a trackball, or cursor direction keys for communicating direction information and command selections to the one or more processors 910 and for controlling cursor movement on the display 940.

One or more transmitters or receivers 955 may also be coupled to the interconnect 905. In some embodiments, the device 900 may include one or more ports 980 for the reception or transmission of data. Data that may be received or transmitted may include video data or audio-video data, such as HDMI, DVI, and MHL data, and may be encrypted for transmission, such as HDCP (High-Bandwidth Digital-Content Protection) encrypted data. In some embodiments, the device includes one or more ports for the transmission and/or reception of data 980 for the transfer of content data 985. In addition, the device 900 may include a USB (Universal Serial Bus) 970.

The device 900 may further include one or more antennas 958 for the reception of data via radio signals. The device 900 may also comprise a power device or system 960, which may comprise a power supply, a battery, a solar cell, a fuel cell, or other system or device for providing or generating power. The power provided by the power device or system 960 may be distributed as required to elements of the device 900.

In the description above, for the purposes of explanation, numerous specific details are set forth in order to provide a thorough understanding of the present invention. It will be apparent, however, to one skilled in the art that the present invention may be practiced without some of these specific details. In other instances, well known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. A method comprising:
   receiving a plurality of video data streams at a plurality of ports of a multi-port device, including:
      receiving a first video data stream from a first source of a plurality of sources at a first port of the multi-port device, a first video frame of the first video data stream arriving at the first port at a first arrival time, and
      receiving a second video data stream from a second source of the plurality of sources at a second port of the multi-port device, a second video frame of the second video data stream arriving at the second port at a second arrival time;
   determining by the multiport device one or more differences between arrival times of video frames received at each of the plurality of ports, including determining a difference between the first arrival time and the second arrival time;
   determining by the multiport device correction factors for the plurality of sources based at least in part on the differences between the arrival times of the video frames received at each of the plurality of ports, the correction factors being determined to modify transmission time at one or more sources to adjust alignment of arrival of video frames from multiple different sources received at the plurality of ports, the correction factors including a first correction factor for the first source; and
   sending a series of alignment commands based on the correction factors from the multiport device to the one or more sources to provide continuous correction of video frame timing for each of the one or more sources, including sending a first alignment command from the multiport device to the first source, the first alignment command directing the first source to modify a time of transmission by the first source of a third video frame following the first video frame using the first correction factor;
   wherein each of the one or more sources is to modify the timing for the transmission of video frames in response to the received alignment commands without coordination with any other of the one or more data sources.

2. The method of claim 1, wherein the video data is one or more of HDMI™ (High-Definition Multimedia Interface) compatible data and MHL™ (Mobile High-Definition Link) compatible data.

3. The method of claim 1, wherein each of the alignment commands is sent via a command bus between the multi-port device and the respective source, including the first alignment command being sent via a first command bus between the multi-port device and the first source.

4. The method of claim 1, wherein the first alignment command directs the first source to modify the time of transmission of the third video frame in order to adjust alignment of arrival of video frames at the plurality of ports, including alignment of arrival of the third video frame with arrival of a fourth video frame following the second video frame transmitted by the second source.

5. The method of claim 4, wherein the first alignment command provides for synchronizing arrival of video frames at the plurality of ports, including synchronizing the arrival of the third video frame at the first port and the arrival of the fourth video frame at the second port at a common time.

6. The method of claim 4, wherein the first alignment command provides for synchronizing the arrival of the third video frame at the first port and the arrival of the fourth video frame at the second port with a certain offset.

7. The method of claim 1, wherein the third video frame arrives at the first port at a third arrival time and the fourth video frame arrives at the second port at a fourth time, further comprising determining a difference between the third arrival time and the fourth arrival time.

8. The method of claim 7, further comprising determining correction factors based at least in part on the difference between the third arrival time and fourth arrival time, the correction factors including a second correction factor for the first source and a third correction factor for the second source.

9. The method of claim 1, wherein one or more of the first video frame and the second video frame is encrypted, and wherein determining differences between arrival times of video frames and determining one or more correction factors is performed without decrypting the first video frame or the second video frame.

10. The method of claim 1, comprising repeating the determining one or more differences, determining one or more correction factors, and sending one or more alignment commands in a closed feedback loop.

11. The method of claim 10, further comprising utilizing the closed feedback loop to address drift in frame to frame timings.

12. The method of claim 1, wherein a pixel clock for the first video data stream is asynchronous with a pixel clock for the second video data stream.

13. The method of claim 1, wherein the first video data stream has a different video mode than the second video data stream.

14. The method of claim 1, wherein the first video data stream has a different pixel frequency than the second video data stream.

15. An apparatus comprising:
a plurality of ports for the reception of video data streams from a set of data sources, each of the plurality of ports receiving a video data stream from a data source, each video data stream comprising a stream of video frames;
a clock signal to time the arrival of video frames at each of the plurality of ports;
logic to compare arrival times of video frames at the plurality of ports, to determine differences between the arrival times, and to generate correction factors for each of the data sources of the set of data sources based on the differences between the arrival times; and
an interface to one or more bus connections with the set of data sources, the apparatus to generate and transmit one or more alignment commands via the one or more bus connections based on the correction factors to one or more of the data sources, the one or more alignment commands to direct modification of video frame transmission times at each of the one or more data sources to synchronize arrival of video frames from multiple different data sources received at the plurality of ports;
wherein the apparatus is to send a series of alignment commands to provide continuous correction of video frame timing for each of the set of data sources; and
wherein each of the one or more data sources is to modify the timing for the transmission of video frames in response to the received alignment commands without coordination with any other of the set of data sources.

16. The apparatus of claim 15, wherein the apparatus is to send the series of alignment commands to provide closed loop feedback to each of the set of data sources.

17. The apparatus of claim 15, wherein the alignment commands provide for aligning arrival of video frames at each of the plurality of ports at a common time.

18. The apparatus of claim 15, wherein the alignment commands provide for modifying transmission time for aligning arrival of video frames at each of the plurality of ports with certain offsets to each other.

19. The apparatus of claim 15, further comprising a link clock for each of the ports, wherein the clock signal is generated by the link clock of one of the ports.

20. The apparatus of claim 15, further comprising a common clock, wherein the clock signal is generated by the common clock, the common clock having a same frequency as a link clock of one of the plurality of ports.

21. The apparatus of claim 15, wherein each of the correction factors provides for advancing or delaying transmission of a video frame by a time factor.

22. The apparatus of claim 21, wherein the time factor is an integer number of link clock periods.

23. The apparatus of claim 15, further comprising a memory element for storage of video frames or portions of video frames, wherein the apparatus is to use the memory element to correct a remaining mismatch of arrival time for video frames at the data ports.

24. The apparatus of claim 15, wherein the apparatus is configured to receive one or more encrypted video frames, and wherein the logic is configured to compare arrival times of video frames, determine offset values, and to generate correction factors without decrypting the one or more encrypted video frames.

25. The apparatus of claim 15, wherein the one or more bus connections includes a separate command bus connection for transmission of commands to each of the set of data sources.

26. The apparatus of claim 15, wherein the one or more alignment commands provide for synchronizing arrival of video frames at the plurality of ports without coordination of data transmission between the set of data sources.

27. The apparatus of claim 15, wherein a pixel clock for a first video data stream is asynchronous with a pixel clock for a second video data stream.

28. The apparatus of claim 15, wherein the first video data stream has a different video mode than a second video data stream.

29. The apparatus of claim 15, wherein a first video data stream has a different pixel frequency than the second video data stream.

30. A method comprising:
generating a video data stream of video frames at a first data source for transmission to a first port of a multi-port device, the first data source being one of a plurality of data sources providing video data streams for transmission to ports of the multi-port device;

transmitting the video frames from the first data source to the multi-port device including timing transmission of the video frames with an output timing generator;

receiving one or more alignment commands at the first data source from the multi-port device via a command bus, the alignment commands being generated by the multi-port device based on correction factors determined for each of the plurality of data sources and providing continuous correction of video frame timing for the first data source, each alignment command containing a correction factor for the transmission of a next following video frame to modify transmission time in order to adjust alignment of arrival of video frames from the first data source at the first port with video frames from one or more other data sources arriving at one or more other ports of the multi-port device; and modifying a transmission time for the next following video frame from the first data source based on the correction factor contained in each alignment command;

wherein the first data source is to modify the timing for the transmission of video frames in response to the received alignment commands without coordination with any other data source of the plurality of data sources.

31. The method of claim 30, wherein the correction factor of each alignment command provides for advancing or delaying the transmission of the next following video frame by a time factor.

32. The method of claim 30, wherein time factor is an integer number of clock cycles.

33. The method of claim 30, wherein receiving one or more alignment commands includes receiving the one or more alignment commands via a command bus between the multi-port device and the first data source.

34. A data source device comprising:
a data port to transmit a video data stream of video frames to a first port of a multi-port device;
a command bus connection to receive alignment commands from the multi-port device, the alignment commands being generated by the multi-port device based on correction factors determined for each data source providing a video data stream to the multi-port device, the alignment commands providing continuous correction of video frame timing for each such data source;
a frame output element to provide video frames to the data port for transmission;
a pixel clock signal for transmission of the video frames of the video data stream; and
an output timing generator to provide timing to the frame output element for transmission of the video frames, the output timing generator to modify the timing for the transmission of the video frames based on the alignment commands generated by and received from the multi-port device via the command bus to adjust alignment of arrival of video frames from the data source device at the first port in relation to arrival of video frames from one or more other data source devices transmitting video data streams of video frames to one or more other ports of the multi-port device;

wherein the data source device is to modify the timing for the transmission of video frames in response to the received alignment commands without coordination with any other data source providing a video data stream to the multi-port device.

35. The device of claim 34, further comprising a memory buffer to store the video data, wherein the frame output element is to obtain the video data from the memory buffer for transmission.

36. The device of claim 35, further comprising a decoder configured to decode a set of data into video frames, the decoder to store decoded video data in the memory buffer.

37. The device of claim 34, wherein each alignment command contains a parameter for advancing or delaying the transmission of a next following video frame by a time factor.

38. The device of claim 37, wherein the time factor is an integer number of pixel clock cycles.

39. A non-transitory computer-readable medium having stored thereon data representing sequences of instructions that, when executed by a processor, cause the processor to perform operations comprising:
receiving a plurality of video data streams at a plurality of ports of a multi-port device, including:
receiving a first video data stream from a first source of a plurality of sources at a first port of a multi-port device, a first video frame of the first video data stream arriving at the first port at a first arrival time, and
receiving a second video data stream from a second source of the plurality of sources at a second port of the multi-port device, a second video frame of the second video data stream arriving at the second port at a second arrival time;
determining by the multiport device one or more differences between arrival times of video frames received at each of the plurality of ports, including determining a difference between the first arrival time and the second arrival time;
determining by the multiport device correction factors for the plurality of sources based at least in part on the differences between the arrival times of the video frames received at each of the plurality of ports, the correction factors being determined to change transmission time at one or more sources to adjust alignment of arrival of video frames from multiple different sources received at the plurality of ports, the correction factors including a first correction factor for the first source; and
sending a series of alignment commands using the correction factors from the multiport device to the one or more sources to provide continuous correction of video frame timing for each of the one or more sources, including sending a first alignment command from the multi-port device to the first source, the first alignment command directing the first source to modify a time of transmission by the first source of a third video frame following the first video frame using the first correction factor;
wherein each of the one or more sources is to modify the timing for the transmission of video frames in response to the received alignment commands without coordination between the one or more sources.

* * * * *